United States Patent
Zhang et al.

(10) Patent No.: US 8,359,824 B2
(45) Date of Patent: Jan. 29, 2013

(54) HEAT RECOVERY STEAM GENERATOR FOR A COMBINED CYCLE POWER PLANT

(75) Inventors: Hua Zhang, Greer, SC (US); Jatila Ranasinghe, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 881 days.

(21) Appl. No.: 12/181,778

(22) Filed: Jul. 29, 2008

(65) Prior Publication Data
US 2010/0024382 A1 Feb. 4, 2010

(51) Int. Cl.
*F02C 6/18* (2006.01)
(52) U.S. Cl. ... 60/39.182; 60/670; 60/39.15; 60/39.181; 165/104.13; 165/104.17; 165/104.19
(58) Field of Classification Search ............ 60/670, 60/39.15, 39.181, 39.182; 165/104.13, 104.14, 165/104.17, 104.19
See application file for complete search history.

(56) References Cited

U.S. PATENT DOCUMENTS

| | | |
|---|---|---|
| 3,517,730 A | 6/1970 | Wyatt |
| 3,722,797 A | 3/1973 | Hammill |
| 3,852,805 A | 12/1974 | Brzozowski |
| 4,033,406 A | 7/1977 | Basiulis |
| 4,036,290 A | 7/1977 | Kelly |
| 4,149,588 A | 4/1979 | Waters |
| 4,226,282 A | 10/1980 | Kunsagi et al. |
| 4,234,782 A | 11/1980 | Barabas et al. |
| 4,280,554 A | 7/1981 | Stockman |
| 4,372,110 A | 2/1983 | Cheng |
| 4,426,959 A | 1/1984 | McCurley |
| 4,621,681 A * | 11/1986 | Grover ............... 165/47 |
| 4,932,204 A | 6/1990 | Pavel et al. |
| 5,233,934 A | 8/1993 | Krigmont et al. |

(Continued)

FOREIGN PATENT DOCUMENTS

| | | |
|---|---|---|
| DE | 294483 | 4/1915 |
| EP | 0794401 A3 | 9/1997 |

(Continued)

OTHER PUBLICATIONS

Hua Zhang et al.; "Apparatus, System and Method for Heating Fuel Gas Using Gas Turbine Exhaust"; filed Jul. 29, 2008 as U.S. Appl. No. 12/181,715.

(Continued)

*Primary Examiner* — Ehud Gartenberg
*Assistant Examiner* — Steven Sutherland
(74) *Attorney, Agent, or Firm* — Cantor Colburn LLP

(57) ABSTRACT

A combined cycle power plant includes a gas turbomachine system including a compressor and a gas turbine that extracts work from gases at a first temperature. The combined cycle power plant also includes a steam turbomachine system including at least one steam turbine that extracts work from gases at a second temperature. The combined cycle power plant further includes a heat recovery steam generator having a main housing fluidly connected to the gas turbine. The heat recovery steam generator includes a plurality of heat pipes that extend within the main housing in fluid communication with the gases at the first temperature. The plurality of heat pipes are also in fluid communication with the gases at the second temperature. The plurality of heat pipes absorb heat from the gases at the first temperature and pass the heat into the gases at the second temperature to form gases at a third temperature.

10 Claims, 1 Drawing Sheet

U.S. PATENT DOCUMENTS

| | | | |
|---|---|---|---|
| 5,237,939 A | 8/1993 | Spokoyny et al. | |
| 5,311,930 A | 5/1994 | Bruenn | |
| 5,632,143 A | 5/1997 | Fisher et al. | |
| 5,918,555 A | 7/1999 | Winegar | |
| 6,041,588 A * | 3/2000 | Bruckner et al. | 60/772 |
| 6,065,280 A | 5/2000 | Ranasinghe et al. | |
| 6,132,823 A | 10/2000 | Qu | |
| 6,241,009 B1 | 6/2001 | Rush | |
| 6,397,575 B2 | 6/2002 | Tomlinson et al. | |
| 6,782,703 B2 | 8/2004 | Dovali-Solis | |
| 6,866,092 B1 | 3/2005 | Molivadas | |
| 6,874,322 B2 * | 4/2005 | Schwarzott | 60/772 |
| 6,916,430 B1 | 7/2005 | Qu | |
| 6,962,051 B2 | 11/2005 | Radcliff | |
| 7,069,716 B1 | 7/2006 | Childers | |
| 7,131,294 B2 | 11/2006 | Manole | |
| 7,382,047 B2 | 6/2008 | Chen et al. | |
| 7,621,720 B2 | 11/2009 | Nies | |
| 7,730,727 B2 | 6/2010 | Yuan et al. | |
| 2003/0182944 A1 | 10/2003 | Hoffman et al. | |
| 2004/0045294 A1 | 3/2004 | Kobayashi et al. | |
| 2006/0083626 A1 | 4/2006 | Manole | |
| 2006/0231235 A1 * | 10/2006 | Yamanaka et al. | 165/51 |
| 2007/0017207 A1 | 1/2007 | Smith et al. | |
| 2007/0068167 A1 | 3/2007 | Patel et al. | |
| 2007/0074515 A1 | 4/2007 | Yoshino | |
| 2007/0234704 A1 | 10/2007 | Moniz et al. | |
| 2008/0115923 A1 * | 5/2008 | Yamanaka et al. | 165/276 |
| 2008/0164009 A1 | 7/2008 | Chong | |
| 2008/0290567 A1 | 11/2008 | Thillen et al. | |
| 2008/0304954 A1 | 12/2008 | Hoffman et al. | |
| 2010/0024382 A1 | 2/2010 | Zhang et al. | |
| 2010/0089062 A1 | 4/2010 | Cao | |

FOREIGN PATENT DOCUMENTS

| | | |
|---|---|---|
| GB | 2099126 A | 12/1982 |

OTHER PUBLICATIONS

Hua Zhang et al.; "Combined Cycle Power Plant"; filed Oct. 17, 2008 as U.S. Appl. No. 12/253,435.

EP Search Report for Application No. EP 09 16 5813; Search Report dated Nov. 18, 2009.

Hua Zhang; "Heat Pipe for Removing Thermal Energy from Exhaust Gas"; U.S. Appl. No. 12/175,966, filed Jul. 18, 2008.

EP Search Report for EP Application No. EP09173330. Dated Nov. 25, 2010.

* cited by examiner

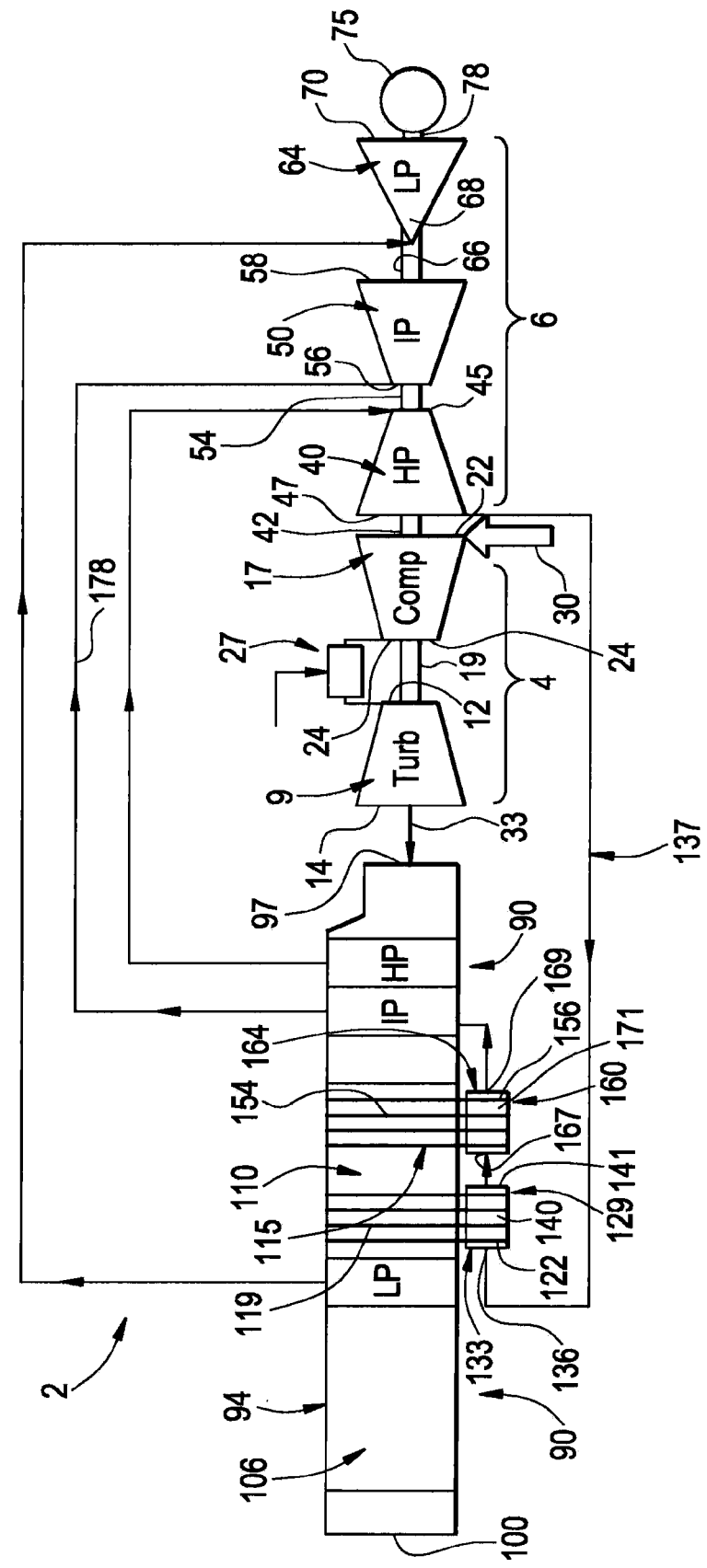

US 8,359,824 B2

1

HEAT RECOVERY STEAM GENERATOR FOR A COMBINED CYCLE POWER PLANT

BACKGROUND OF THE INVENTION

Exemplary embodiments of the present invention relate to the art of combined cycle power plants and, more particularly, to a heat recovery steam generator for a combined cycle power plant.

Conventional combined cycle power plants employ a gas turbine system operatively coupled to a steam turbine system. The gas turbine system includes a compressor coupled to a gas turbine. The steam turbine system includes a high pressure (HP) turbine portion operatively coupled to an intermediate pressure (IP) turbine portion that, in turn, is coupled to low pressure (LP) turbine. Generally, the HP, IP and LP turbines are employed to drive a generator. In a typical combined cycle power plant, exhaust gas from the gas turbine is passed to a heat recovery steam generator (HRSG). The HRSG includes three different pressure heaters corresponding to three steam turbine pressures, e.g. HP, IP, and LP for a high performance combined cycle power plant. The HRSG also receives low energy steam from the HP steam turbine exhaust passing from the HP steam turbine. The low energy steam is used to reheat steam in the different pressure heaters for enhanced efficiency. The reheated steam is then passed back to power a lower pressure stage of the steam turbine.

Conventional HRSG systems employ finned pipes through which flow water and/or steam. The finned pipes are exposed to hot exhaust gases from the gas turbine. The hot exhaust gases flowing over the finned pipes raise a temperature of the water/steam to form high energy steam. The high energy steam is utilized to power the steam turbine to enhance combined cycle power plant efficiency. Flowing the water/steam through the finned pipes creates a significant pressure drop. The pressure drop creates design constraints that effect how much reheated steam can be introduced back into the steam turbine.

BRIEF DESCRIPTION OF THE INVENTION

In accordance with an exemplary embodiment of the invention, a combined cycle power plant includes a gas turbomachine system including a compressor and a gas turbine that extracts work gases at a first temperature. The combined cycle power plant also includes a steam turbomachine system including at least one steam turbine that extracts work from gases at a second temperature. The combined cycle power plant further includes a heat recovery steam generator having a main housing fluidly connected to the gas turbine. The heat recovery steam generator includes a plurality of heat pipes, at least a portion of which extend within the main housing in fluid communication with the gases at the first temperature. The plurality of heat pipes are also in fluid communication with the gases at the second temperature. With this arrangement, the plurality of heat pipes absorb heat from the gases at the first temperature and pass the heat into the gases at the second temperature to form gases at a third temperature.

In accordance with another exemplary embodiment of the invention, a method of treating gases in combined cycle power plant includes passing gases at a first temperature from a gas turbine into a heat recovery steam generator. The gases at the first temperature flow over a first end portion of a plurality of heat pipes arranged within the heat recovery steam generator. The plurality of heat pipes absorb heat from the gases at the first temperature. The heat flows from the first end portion of the plurality of heat pipes toward a second end portion of the plurality of heat pipes. Gases at a second temperature pass over the second end portion of the plurality of heat pipes. The heat is transferred from the second end portion of the plurality of heat pipes into the gas at the second temperature to form a gas at a third temperature.

In accordance with yet another exemplary embodiment of the invention, a heat recovery steam generator includes a main housing, and a plurality of heat pipes, at least a portion of which extend within the main housing. The plurality of heat pipes absorb heat from gases at a first temperature and pass the heat into gases at a second temperature to form gases at a third temperature.

BRIEF DESCRIPTION OF THE DRAWINGS

FIG. 1 is a schematic view of a combined cycle power plant including a heat recovery steam generator constructed in accordance with exemplary embodiments of the invention.

DETAILED DESCRIPTION OF THE INVENTION

With reference to FIG. 1, a combined cycle power plant constructed in accordance with exemplary embodiments of the invention is indicated generally at 2. Power plant 2 includes a gas turbomachine system 4 operatively connected to a steam turbomachine system 6. As shown, gas turbomachine system 4 includes a gas turbine 9 having an inlet portion 12 and an outlet portion 14. Gas turbine 9 is operatively connected to a compressor 17 via a shaft 19. Compressor 17 includes an inlet portion 22 and an outlet portion 24. Gas turbomachine system 4 further includes a combustor 27. With this arrangement, inlet air 30 passing into inlet portion 22 of compressor 17 is compressed, mixed with fuel in combustor 27 and ignited to form a high pressure, high temperate gas stream. The high temperature, high pressure gas stream is passed to gas turbine 9. Gas turbine 9 extracts work from the high temperature, high pressure gas stream to produce rotational energy. The high temperature gases pass from outlet portion 14 of gas turbine 9 in the form of exhaust gases at a first temperature.

As further shown in FIG. 1, steam turbomachine system 6 includes a high pressure (HP) turbine section 40 operatively coupled to compressor 17 via a shaft 42. HP turbine section 40 includes an inlet or high pressure stage section 45 and an outlet or low pressure stage section 47. HP turbine section 40 is also operatively coupled to an intermediate pressure (IP) turbine section 50 via a shaft 54. In a manner similar to that describe above, IP turbine section 50 includes an inlet section 56 and an outlet section 58. Steam at outlet section 58 is at a lower pressure than steam at inlet section 56. In a manner also similar to that described above, IP turbine section 50 is also operatively connected to a low pressure (LP) turbine section 64 via a shaft 66. LP turbine section 64 includes an inlet section 68 and an outlet section 70. Steam at outlet section 70 is at a lower pressure than steam at inlet section 68. In the exemplary embodiment shown, LP turbine section 66 is operatively coupled to a generator 75 via a shaft 78. Steam turbomachine 6 utilizes steam as a working fluid to drive generator 75.

In further accordance with the exemplary embodiment shown, power plant 2 includes a heat recovery steam generator (HRSG) 90 fluidly connected to gas turbine 9. HRSG 90 includes a main housing 94 having an inlet 97 that leads to an outlet 100 through a heat chamber 106. HRSG 90 further includes a first plurality of heat pipes 110 and a second plurality of heat pipes 115. At this point it should be understood that the term "heat pipes" should be construed to mean sealed pipes. A vacuum pump is used to exclude all fluids (both gases and liquids) from an interior of the sealed pipes after which the pipes are filled with a fraction of a percent by volume of a working fluid or coolant such as, but not limited to, water, ethanol, acetone, sodium or mercury. The partial vacuum is near to or below the vapor pressure of the working fluid such that, some of the fluid will be in a liquid phase and some of the fluid will be in a gas phase. A wick (not shown) capable of absorbing fluid is located within the sealed pipes. The thermal energy is transferred to the heat pipe by evaporating fluid in the wick. Other examples of heat pipes include sealed pipes having no internal working fluid. Instead, such heat pipes include "Qu-materials" having a very high thermal conductivity. The "Qu-material" is typically in the form of a coating provided on interior surfaces of the heat pipes.

In any event, each of the first plurality of heat pipes 110 includes a first end portion 119 that extends through heat chamber 106 to a second end portion 122 that extends out from main housing 94. More specifically, each second end portion 122 extends from main housing 94 into a first reheat member 129. First reheat member 129 includes a main body 133 having an inlet member 136 fluidly connected to high pressure section 45 of HP turbine section 40 via a steam conduit 137. Inlet member 136 receives gases, e.g., steam, at a second temperature. The steam at the second temperature is passed through an interior chamber 140 to an outlet member 141. As will be discussed more fully below, the gases at the second temperature flow over the first plurality of heat pipes 110, absorb heat, and exit outlet member 141 as gasses at a third temperature. In accordance with one aspect of the invention, the gases exit reheat member as re-heated steam.

In a similar manner, each of the second plurality of heat pipes 115 includes a first end portion 154 that extends through heat chamber 106 to a second end portion 156 that extends out from main housing 94. More specifically, each second end portion 156 extends from main housing 94 into a second reheat member 160. Second reheat member 160 includes a main body 164 having an inlet member 167 fluidly connected to first reheat member 129 via a steam conduit (not shown). Inlet member 167 receives gases, e.g., steam, at the third temperature from first reheat member 129 that are passed through an interior chamber 171 to an outlet member 172. As will be discussed more fully below, the gases at the third temperature flow over the second plurality of heat pipes 115, absorb heat, and exit outlet member 138 as gasses at a fourth temperature. In accordance with one aspect of the invention, the gases exit reheat member as re-heated steam. The gases then pass back to inlet section 56 of IP turbine section 50 via a steam conduit 178. Gases also pass from the HRSG to other components of the steam turbine via additional conduits not separately labeled.

With this arrangement, exhaust gases passing from turbine 9 enter main housing 94 of HRSG 90. The exhaust gases flow over first end sections 119 and 154 of the first and second pluralities of heat pipes 110 and 115 respectively. Heat from the exhaust gases is absorbed by the pluralities of heat pipes 110 and 1 15. The heat flows from first end portions 119 and 154 toward respective second end portions 122 and 156 in reheat members 129 and 160 respectively. Steam passing from HP section 40, into reheat members 129 and 160, flows over the respective second end portions 122, 156 and absorbs the heat. The steam then flows back to IP turbine section 50 as re-heated steam to enhance turbomachine efficiencies.

At this point it should be appreciated that a HRSG constructed in accordance with exemplary embodiments of the invention would be simple to build and be easy to maintain. Furthermore, it should be appreciated that the first and second pluralities of heat pipes can be arranged in a variety of patterns in order to enhance heat exchange efficiency. That is, the heat pipes can be arranged in various configurations so as to enhance surface area exposure to the respective air streams. Moreover, the HRSG in accordance with the exemplary embodiment would not require water as a coolant or any associated water handling equipment, and can be constructed on a relatively small footprint.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A combined cycle power plant comprising:
a gas turbomachine system including a compressor and a gas turbine, the gas turbine extracting work from first gases at a first temperature;
a steam turbomachine system including at least one steam turbine having a high pressure portion and an intermediate pressure portion, the at least one steam turbine extracting work from second gases at a second temperature; and
a heat recovery steam generator having a main housing fluidly connected to the gas turbomachine, the heat recovery steam generator including a reheat member arranged outside the main housing, the reheat member having an interior chamber fluidly connected to the high pressure portion of the steam turbine through a steam conduit and to the intermediate pressure portion of the steam turbine through an outlet member, a plurality of sealed heat pipes having a partial vacuum, at least a portion of the plurality of sealed heat pipes extend within the main housing in fluid communication with the gases at the first temperature, the plurality of heat pipes also being in fluid communication with the gases at the second temperature within the interior chamber, wherein the plurality of sealed heat pipes absorb heat from the first gases at the first temperature and pass the heat into the second gases at the second temperature to raise the temperature of the second gases to a third temperature, the second gases at the third temperature being passed back through the main housing and to the intermediate portion of the steam turbine through the outlet member.

2. The combined cycle power plant according to claim 1, wherein each of the plurality of sealed heat pipes includes a first end portion extending into the main housing of the heat recovery steam generator and a second end portion extending out from the main housing of the heat recovery steam generator.

3. The combined cycle power plant according to claim 2, wherein the at least one reheat member includes an inlet member connected at a first pressure stage of the at least one steam turbine and an outlet member connected to a second pressure stage of the at least one steam turbine, the gases at the third temperature being passed to the second pressure stage of the at least one steam turbine.

4. The combined cycle power plant according to claim 3, wherein the at least one steam turbine is a high pressure turbine, the second pressure stage being at a pressure lower than the first pressure stage.

5. The combined cycle power plant according to claim 1, wherein the first gases at the first temperature comprise exhaust gases from the gas turbine and the second gases at the second temperature comprise steam from the at least one steam turbine, the first temperature being higher than the second temperature.

6. A method of treating gases in combined cycle power plant, the method comprising:
   passing gases at a first temperature from a gas turbine into a heat recovery steam generator;
   flowing the gases at the first temperature over a first end portion of a plurality of sealed heat pipes having a partial vacuum arranged within the heat recovery steam generator;
   absorbing heat from the gases at the first temperature into the plurality of heat pipes;
   flowing the heat from the first end portion of the plurality of sealed heat pipes toward a second end portion of the plurality of sealed heat pipes arranged in a reheat member that is distinct from the heat recovery steam generator;
   passing gases from a steam turbomachine at a second temperature over the second end portion of the plurality of sealed heat pipes; and
   transferring the heat from the second end portion of the plurality of sealed heat pipes into the gases at the second temperature to heat the gases to a third temperature; and
   passing the gases at the third temperature from the reheat member into the heat recovery steam generator.

7. The method of claim 6, wherein passing gases at the first temperature comprises passing exhaust gases from the gas turbine into the heat recovery steam generator.

8. The method of claim 6, further comprising:
   extracting the gases at the second temperature from a first stage of a steam turbine.

9. The method of claim 8, further comprising: passing the gases at the third temperature to second stage of the steam turbine.

10. The method of claim 6, wherein forming the gases at the third temperature comprises forming re-heated steam.

* * * * *